United States Patent
Imata et al.

(10) Patent No.: US 8,692,879 B2
(45) Date of Patent: Apr. 8, 2014

(54) IMAGE CAPTURING SYSTEM, IMAGE CAPTURING DEVICE, INFORMATION PROCESSING DEVICE, AND IMAGE CAPTURING METHOD

(75) Inventors: Masanori Imata, Kanagawa (JP); Yusuke Kanehira, Kanagawa (JP); Tsuyoshi Umemura, Kanagawa (JP); Yuichi Yabushita, Kanagawa (JP)

(73) Assignee: Sony Corporation, Tokyo (JP)

( * ) Notice: Subject to any disclaimer, the term of this patent is extended or adjusted under 35 U.S.C. 154(b) by 351 days.

(21) Appl. No.: 12/870,430

(22) Filed: Aug. 27, 2010

(65) Prior Publication Data

US 2011/0063466 A1   Mar. 17, 2011

(30) Foreign Application Priority Data

Sep. 15, 2009   (JP) ................................. 2009-213378

(51) Int. Cl.
*H04N 7/18*   (2006.01)
(52) U.S. Cl.
USPC .......................................... 348/135; 348/143
(58) Field of Classification Search
None
See application file for complete search history.

(56) References Cited

U.S. PATENT DOCUMENTS

| | | | |
|---|---|---|---|
| 6,867,798 B1 * | 3/2005 | Wada et al. | 348/143 |
| 2003/0218675 A1 * | 11/2003 | Nonoyama | 348/144 |
| 2004/0169724 A1 * | 9/2004 | Ekpar | 348/36 |
| 2005/0237382 A1 * | 10/2005 | White | 348/14.16 |
| 2006/0055777 A1 * | 3/2006 | Ito et al. | 348/143 |
| 2006/0215027 A1 * | 9/2006 | Nonoyama et al. | 348/144 |
| 2008/0204560 A1 * | 8/2008 | Nilsson | 348/187 |
| 2009/0015670 A1 * | 1/2009 | Gopinath et al. | 348/143 |
| 2012/0098927 A1 * | 4/2012 | Sablak | 348/36 |

FOREIGN PATENT DOCUMENTS

| | | | | |
|---|---|---|---|---|
| JP | 2005-354461 A | * | 12/2005 | ............... H04N 7/18 |
| JP | 2007-43505 | | 2/2007 | |

* cited by examiner

*Primary Examiner* — Sath V Perungavoor
*Assistant Examiner* — Dakshesh Parikh
(74) *Attorney, Agent, or Firm* — Oblon, Spivak, McClelland, Maier & Neustadt, L.L.P.

(57) ABSTRACT

An image capturing system is provided which includes a detection section for detecting a position of an capturing section capable of performing a pan operation and a tilt operation, a determination section for determining which coordinate system is used, either a first coordinate system representing the position of the capturing section in the pan direction and the tilt direction or a second coordinate system representing a position of a subject image of the subject captured by the capturing section in a screen, and a coordinate calculator for calculating coordinates representing the position of the capturing section in the first coordinate system based on the detected position of the capturing section when using the first coordinate system, and calculating coordinates representing the position of the subject image in the second coordinate system based on the detected position of the capturing section when using the second coordinate system.

8 Claims, 15 Drawing Sheets

IMAGE CAPTURING SYSTEM, IMAGE CAPTURING DEVICE, INFORMATION PROCESSING DEVICE, AND IMAGE CAPTURING METHOD

BACKGROUND OF THE INVENTION

1. Field of the Invention

The present invention relates to an image capturing system, an image capturing device, an information processing device, and an image capturing method.

2. Description of the Related Art

Image capturing devices such as a digital still camera and a video camera include, for example, an image capturing device which is fixed to a ceiling or the like and captures an image of a subject by an image capturing section including a lens operating in a pan direction or in a tilt direction. The operation in the pan direction is an operation for rotating the image capturing section in the right-left direction (horizontal direction), and the operation in the tilt direction is an operation for rotating the image capturing section in the up-down direction (vertical direction). In this way, a wide range image can be captured by one image capturing device.

In Japanese Patent Application Laid-Open No. 2007-43505, in a technique for capturing an entire object image as a panoramic image by using a camera which can perform the pan operation and the tilt operation, an image capturing system which quickly moves an image capturing direction to a desired direction is disclosed.

SUMMARY OF THE INVENTION

A movable range of the pan operation or the tilt operation of the image capturing section of the image capturing device is different depending on a mechanism of the image capturing device. For example, there are an image capturing device which can rotate 360° in the pan operation and rotate only 90° from the horizontal direction (0°) in the tilt operation, an image capturing device which can rotate 180° from the horizontal direction (0°) to the opposite horizontal direction in the tilt operation, and the like. When various processing of the image capturing device is performed, to represent an image capturing direction of the image capturing device, a coordinate system (hereinafter referred to as "pan-tilt coordinate system") using a pan angle and a tilt angle of the image capturing section is used.

In the image capturing device which can rotate 360° in the pan operation and rotate from the horizontal direction (0°) to the opposite horizontal direction (180°) in the tilt operation, there are two positions at which the image capturing directions are the same although the absolute positions of the image capturing section are different from each other. Specifically, when representing the position of the image capturing section by the pan-tilt coordinate system based on the absolute position of the image capturing section, both the image capturing section at a position of (pan angle, tilt angle)= (0°, 0°) and the image capturing section at a position of (pan angle, tilt angle)=(−180°, −180°) capture a subject in the same direction.

However, in the image capturing device, there may be a mechanical error such as misalignment between a rotation axis of the pan operation or the tilt operation and a central axis of an image capturing device 100. Therefore, at the position of (pan angle, tilt angle)=(0°, 0°) and at the position of (pan angle, tilt angle)=(−180°, −180°), the image capturing section is not necessarily at the same position, and there may be misalignment in the image capturing direction.

When using the pan-tilt coordinate system based on the absolute position of the image capturing section, there is an issue that the position of the subject image captured by the image capturing device is difficult to represent because there are two types of coordinate values to represent the same image capturing direction.

In light of the foregoing, it is desirable to provide a novel and improved image capturing system, image capturing device, information processing device, and image capturing method, capable of appropriately identifying a position of an image capturing section and appropriately identifying a position of a subject in a screen when including a mechanism that can rotate 360° in the pan operation and rotate from the horizontal direction (0°) to the opposite horizontal direction (180°) in the tilt operation.

According to an embodiment of the present invention, there is provided an image capturing system including a position detection section for receiving light from a subject and detecting a position of an image capturing section capable of performing a pan operation and a tilt operation in a pan direction and a tilt direction, a coordinate system determination section for determining which coordinate system is used, either a first coordinate system representing the position of the image capturing section in the pan direction and the tilt direction or a second coordinate system representing a position of a subject image of the subject captured by the image capturing section in a screen, and a coordinate calculator for calculating coordinates representing the position of the image capturing section in the first coordinate system based on the detected position of the image capturing section when using the first coordinate system, and calculating coordinates representing the position of the subject image in the second coordinate system based on the detected position of the image capturing section when using the second coordinate system.

A first direction of coordinate axes in the tilt direction in the second coordinate system may be set as 0°, the first direction to a direction perpendicular to the first direction may be set as 0° to −90°, a second direction 180° from the first direction may be also set as 0°, and the second direction to a direction perpendicular to the second direction may be set as 0° to −90°.

In the second coordinate system, directions of the two 0° in the coordinate axes in the tilt direction may be adjusted in the pan direction and the tilt direction.

The first coordinate system may be a coordinate system specifying the position of the image capturing section by unique coordinates, and used when controlling a driving section that drives the image capturing section or moving the image capturing section by specifying an absolute position, and the second coordinate system may be used for privacy masking processing for masking a part of an area in the screen so that the subject image is difficult to identify, area titling processing for superimposing a name of the subject image on the subject image and displaying the name and the subject image on the screen, or area zoom processing for detecting the specific subject image and zooming the subject image.

A third direction of coordinate axes in the pan direction in the first coordinate system may be set as 0°, 0° to +180° may be set in clockwise direction, and 0° to −180° may be set in counterclockwise direction.

A fourth direction of coordinate axes in the tilt direction in the first coordinate system is set as 0°, a direction perpendicular to the fourth direction is set as −90°, and 0° to −180° are set from the fourth direction.

A fifth direction of coordinate axes in the pan direction in the second coordinate system may be set as 0°, 0° to +180° may be set in clockwise direction, and 0° to −180° may be set in counterclockwise direction.

According to an embodiment of the present invention, there is provided an image capturing device including a position detection section for receiving light from a subject and detecting a position of an image capturing section capable of performing a pan operation and a tilt operation in a pan direction and a tilt direction, and a position transmission section for transmitting the detected position to a remote control device including a coordinate system determination section for determining which coordinate system is used, either a first coordinate system representing the position of the image capturing section in the pan direction and the tilt direction or a second coordinate system representing a position of a subject image of the subject captured by the image capturing section in a screen and a coordinate calculator for calculating coordinates representing the position of the image capturing section in the first coordinate system based on the detected position of the image capturing section when using the first coordinate system, and calculating coordinates representing the position of the subject image in the second coordinate system based on the detected position of the image capturing section when using the second coordinate system.

According to an embodiment of the present invention, there is provided an information processing device including a position receiving section for receiving a detected position from an image capturing device including a position detection section for receiving light from a subject and detecting a position of an image capturing section capable of performing a pan operation and a tilt operation in a pan direction and a tilt direction, a coordinate system determination section for determining which coordinate system is used, either a first coordinate system representing the position of the image capturing section in the pan direction and the tilt direction or a second coordinate system representing a position of a subject image of the subject captured by the image capturing section in a screen, and a coordinate calculator for calculating coordinates representing the position of the image capturing section in the first coordinate system based on the detected position of the image capturing section when using the first coordinate system, and calculating coordinates representing the position of the subject image in the second coordinate system based on the detected position of the image capturing section when using the second coordinate system.

According to an embodiment of the present invention, there is provided an image capturing method including the steps of receiving light from a subject and detecting a position of an image capturing section capable of performing a pan operation and a tilt operation in a pan direction and a tilt direction, determining which coordinate system is used, either a first coordinate system representing the position of the image capturing section in the pan direction and the tilt direction or a second coordinate system representing a position of a subject image of the subject captured by the image capturing section in a screen, and calculating coordinates representing the position of the image capturing section in the first coordinate system based on the detected position of the image capturing section when using the first coordinate system, and calculating coordinates representing the position of the subject image in the second coordinate system based on the detected position of the image capturing section when using the second coordinate system.

As described above, according to an embodiment of the present invention, it is possible to appropriately identify the position of the image capturing section and appropriately identify the position of the subject image in the screen when including a mechanism that can rotate 360° in the pan operation and rotate from the horizontal direction (0°) to the opposite horizontal direction (180°) in the tilt operation.

DETAILED DESCRIPTION OF THE EMBODIMENTS

Figure 1:
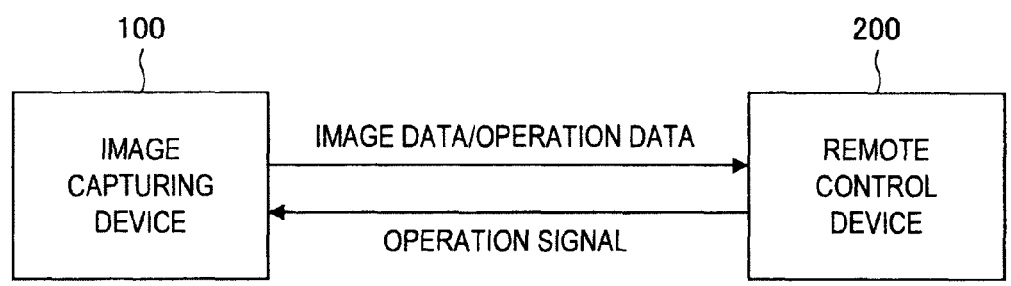
FIG. 1 is a block diagram showing an image capturing system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Configuration of the image capturing system
2. Operation of the image capturing device 100
3. Determination of coordinate system in the image capturing system <1. Configuration of the Image Capturing System>

[Image Capturing System]

First, an image capturing system according to one embodiment of the present invention will be described. FIG. 1 is a block diagram showing the image capturing system according to this embodiment.

The image capturing system according to this embodiment includes, for example, an image capturing device 100 and a remote control device 200. Although, an example shown in FIG. 1 shows a case in which one image capturing device 100 and one remote control device 200 are connected to each other, a plurality of image capturing devices 100 may be connected to one remote control device 200.

The image capturing device 100 is a video camera, a monitoring camera, or the like, and captures a subject image to generate image data. The image capturing device 100 transmits the captured image data to the remote control device 200. The image capturing device 100 rotates the image capturing section 102 and performs zoom in/out image capturing based on an operation signal from the remote control device 200. The image capturing device 100 transmits operational data showing an operation and a state of an image capturing section 102 of the image capturing device 100 to the remote control device 200.

The remote control device 200 is, an information processing device such as, for example, a personal computer and a monitoring panel, and connected to one or a plurality of image capturing devices 100. The remote control device 200 displays an image from the image capturing device 100 and remotely controls the image capturing device 100. The remote control device 200 receives the image data from the image capturing device 100 and the operational data showing an operation and a state of the image capturing section 102 of the image capturing device 100. The remote control device 200 transmits an operation signal to the image capturing device 100 via an operation of a user.

[Image Capturing Device 100]

Figure 2:
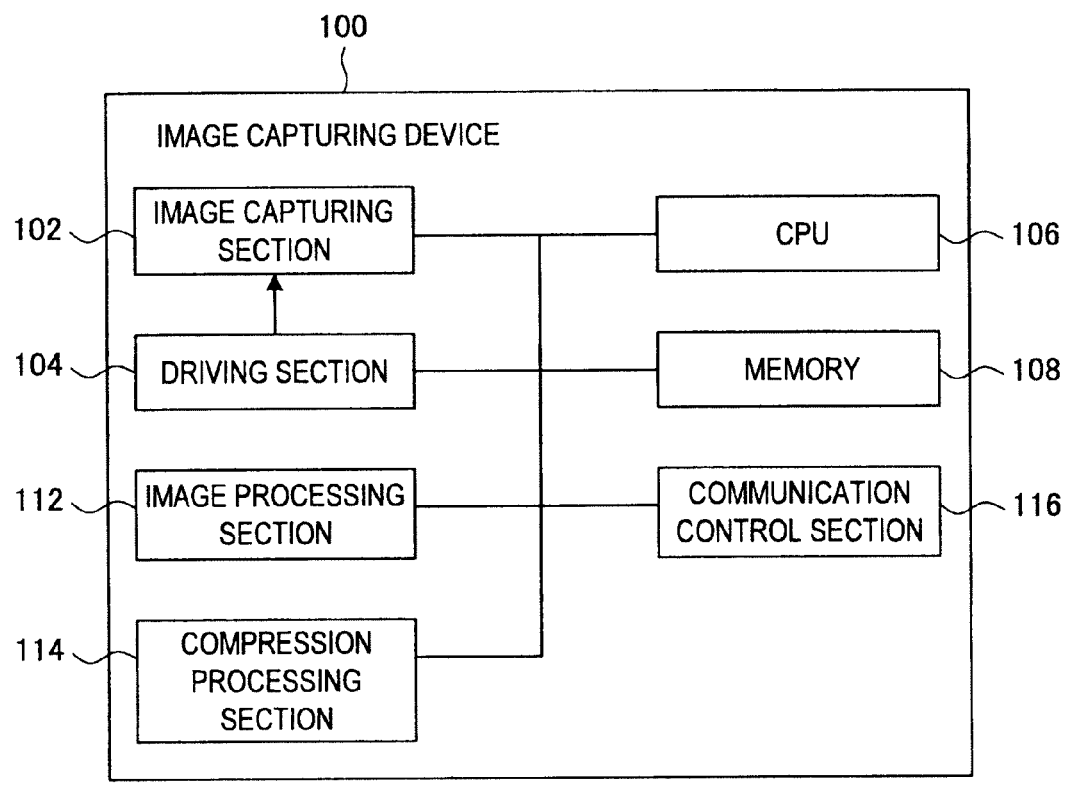
FIG. 2 is a block diagram showing an image capturing device 100 according to the embodiment.

Next, a configuration of functional blocks of the image capturing device 100 according to this embodiment will be described. FIG. 2 is a block diagram showing the image capturing device 100 according to this embodiment.

The image capturing device 100 includes, for example, the image capturing section 102, a driving section 104, a CPU 106, a memory 108, an image processing section 112, a compression processing section 114, a communication control section 116, and the like.

The image capturing section 102 includes an optical system such as a lens, an imaging element such as a CCD image sensor or a CMOS image sensor, a preprocessing section, and the like. The image capturing section 102 converts light information from a subject into an electric signal and transmits the electric signal to the image processing section 112 and the like as an image signal. The image capturing section 102 operates in the pan direction and in the tilt direction. The image capturing device 100 according to this embodiment has a mechanism that can rotate 360° in the pan operation and rotate from the horizontal direction (0°) to the opposite horizontal direction (180°) in the tilt operation.

The driving section 104 drives and rotates the image capturing section 102 so that the image capturing section 102 performs the pan operation and the tilt operation. The driving section 104 drives the optical system of the image capturing section 102 to cause the image capturing section 102 to perform a zooming operation and a focusing operation. The driving section 104 is an example of a position detection section. The driving section 104 detects the positions in the pan direction and the tilt direction of the image capturing section 102 and transmits the detection result to the remote control device 200.

The CPU (Central Processing Unit) 106 is an arithmetic processing device, a control device, and the like, and executes a program recorded in the memory 108. The program executed by the CPU 106 is recorded in the memory 108, and the program is read when the CPU 106 executes the program.

The image processing section 112 performs various image processing on the image signal received from the image capturing section 102. The image data on which the image processing is performed is transmitted to the compression processing section 114, or transmitted to the remote control device 200 via the communication control section 116.

The compression processing section 114 encodes (compresses) the image data on which the image processing is performed by, for example, the JPEG method. The compressed image data is transmitted to the remote control device 200 via the communication control section 116.

The communication control section 116 controls data transmission through wired communication or wireless communication. In this embodiment, image data and operation data are transmitted to the remote control device 200, and on the contrary, an operation signal and the like are received from the remote control device 200. The communication control section 116 is an example of a position transmission section, and the communication control section 116 transmits operation data including the position of the image capturing section 102 in the pan direction and the tilt direction.

Next, a configuration of an exterior appearance of the image capturing device 100 according to this embodiment will be described with reference to FIGS. 4 to 8. FIGS. 4 to 8 are a side view (A) and a bottom view (B) showing the image capturing device 100 according to this embodiment.

The image capturing device 100 according to this embodiment includes, for example, a main body 120, a support member 130, a rotation shaft members 132 and 134, a support base 136, and the like.

The main body 120 is a main body of the image capturing device 100 including the image capturing section 102, the CPU 106, and the like. The main body 120 is mounted on a ceiling 1 by the support member 130, the rotation shaft members 132 and 134, the support base 136, and the like. The main body 120 operates in the pan direction and operates in the tilt direction by the rotations of the support member 130 and the rotation shaft members 132 and 134. The main body 120 can rotate 360° in the pan operation and rotate from the horizontal direction (0°) to the opposite horizontal direction (180°) in the tilt operation.

The support member 130 is connected to the ceiling 1 via the rotation shaft member 134 and the support base 136 in the upper portion, and connected to the main body 120 via the rotation shaft member 132 in the lower portion.

One end of the rotation shaft member 132 is connected to the main body 120 and the other end is connected to the support member 130. The rotation shaft member 132 is provided so that the shaft direction thereof is in the horizontal direction. The rotation shaft member 132 rotates the main body 120 around the shaft direction of the rotation shaft member 132 as the central axis. As a result, the main body 120 operates in the vertical direction (the tilt direction).

One end of the rotation shaft member 134 is connected to the support base 136 and the other end is connected to the support member 130. The rotation shaft member 134 is provided so that the shaft direction thereof is in the vertical direction. The rotation shaft member 134 rotates the main body 120 and the support member 130 around the shaft direction of the rotation shaft member 134 as the central axis. As a result, the main body 120 operates in the horizontal direction (the pan direction).

[Remote Control Device 200]

Figure 3:
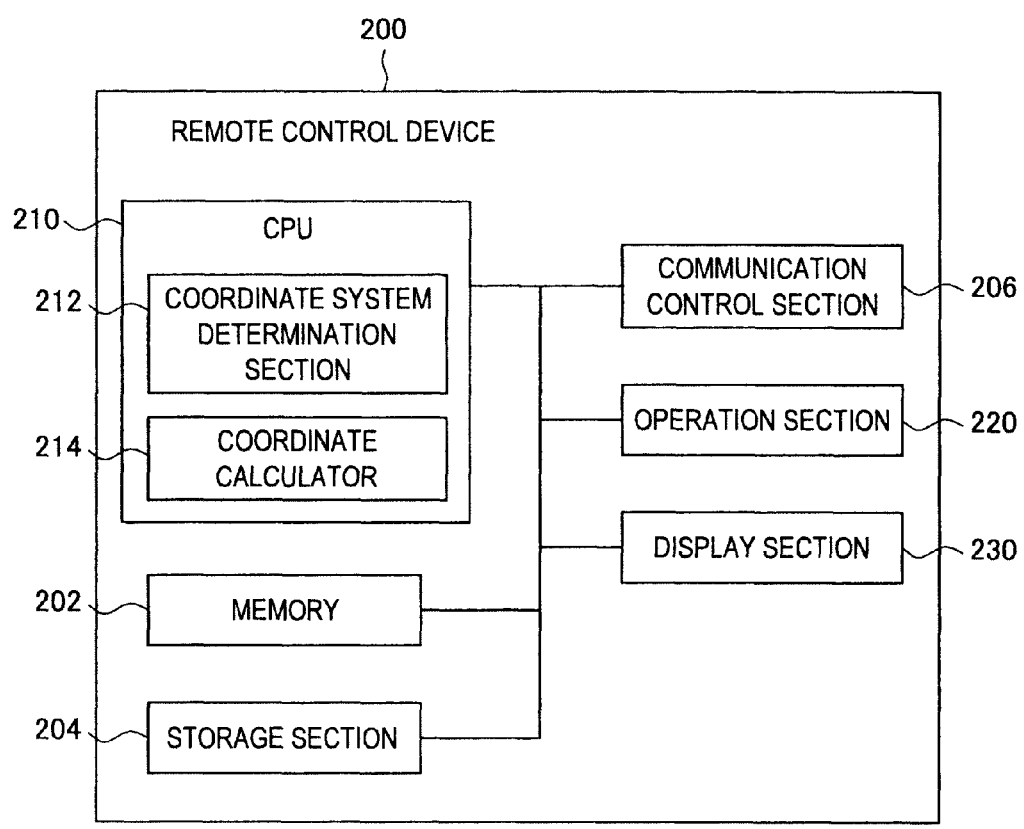
FIG. 3 is a block diagram showing a remote control device 200 according to the embodiment.

Next, a configuration of the remote control device 200 according to this embodiment will be described. FIG. 3 is a block diagram showing the remote control device 200 according to this embodiment.

The remote control device 200 includes, for example, a memory 202, a storage section 204, a communication control section 206, a CPU 210, an operation section 220, a display section 230, and the like.

A program executed by the CPU 210 is recorded in the memory 202, and the program is read when the CPU 210 executes the program.

The storage section 204 is, for example, an HDD, a flash memory, or the like, and the storage section 204 records image data captured by the image capturing device 100 and reads the recorded image data.

The communication control section 206 controls data transmission through wired communication or wireless communication. In this embodiment, the communication control section 206 receives image data and operation data from the image capturing device 100 and transmits an operation signal to the image capturing device 100. The communication control section 206 is an example of a position reception section and receives operation data including the position of the image capturing section 102 in the pan direction and the tilt direction.

The CPU (Central Processing Unit) 210 is an arithmetic processing device, a control device, and the like, and executes a program recorded in the memory 202. The CPU 210 according to this embodiment includes a coordinate system determination section 212, a coordinate calculator 214, and the like.

In various processing of the image capturing device 100, the coordinate system determination section 212 determines which coordinate system is used, either a first coordinate system representing the position of the image capturing section 102 in the pan direction and the tilt direction or a second coordinate system representing the position of a subject captured by the image capturing section 102 in the screen.

When using the first coordinate system, the coordinate calculator 214 calculates coordinates representing the position of the image capturing section 102 in the first coordinate system based on a detected position of the image capturing section 102. When using the second coordinate system, the coordinate calculator 214 calculates coordinates representing the position of the subject in the screen in the second coordinate system based on the detected position of the image capturing section 102.

The operation section 220 is, for example, a keyboard, a mouse, a stick controller, and the like. The operation section 220 receives an operation of a user, generates an operation signal, and transmits the operation signal to the image capturing device 100 via the CPU 210 and the communication control section 206.

The display section 230 is, for example, a liquid crystal display, an organic EL display, or the like. The display section 230 displays the subject captured by the image capturing device 100 on the screen. Further, the display section 230 displays a menu related to various settings of the image capturing device 100 or the remote control device 200 and an application related to settings of image processing on the screen.

The processing in which the remote control device 200 determines the coordinate axis and calculates coordinates may be performed by the image capturing device 100. At this time, the processing performed by the coordinate system determination section 212 and the coordinate calculator 214 is performed by the CPU 106 of the image capturing device 100.

<2. Operation of the Image Capturing Device 100>

Next, the pan operation and the tilt operation of the image capturing device 100 according to this embodiment will be described with reference to FIGS. 4 to 8. As described above, the image capturing device 100 according to this embodiment has a mechanism that can rotate 360° in the pan operation and rotate from the horizontal direction (0°) to the opposite horizontal direction (180°) in the tilt operation.

First, the pan operation of the image capturing device 100 will be described.

Figure 4A:
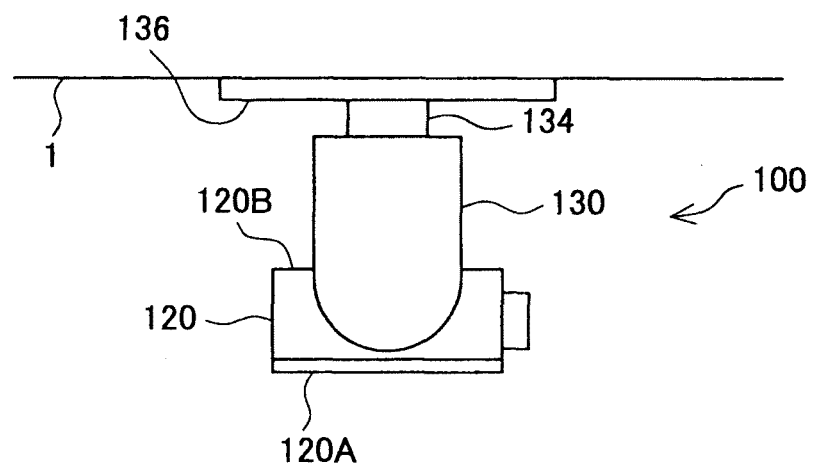
FIG. 4A is a side view showing the image capturing device 100 according to the embodiment.
Figure 4B:
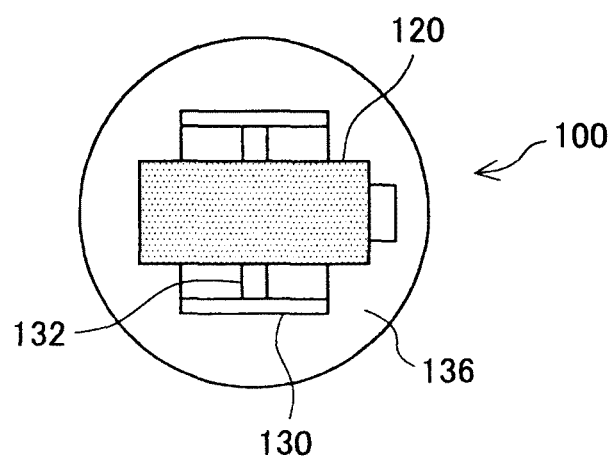
FIG. 4B is a bottom view showing the image capturing device 100 according to the embodiment.
Figure 5A:
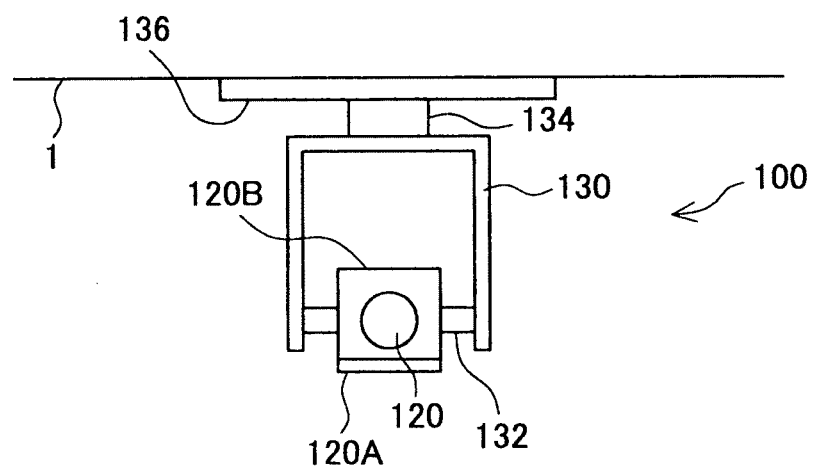
FIG. 5A is a side view showing the image capturing device 100 according to the embodiment.
Figure 5B:
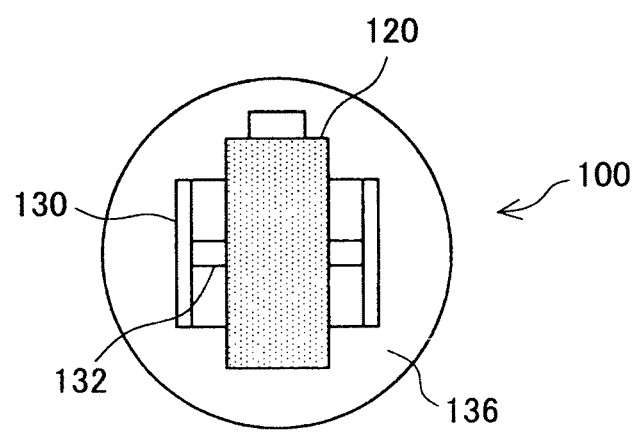
FIG. 5B is a bottom view showing the image capturing device 100 according to the embodiment.
Figure 6A:
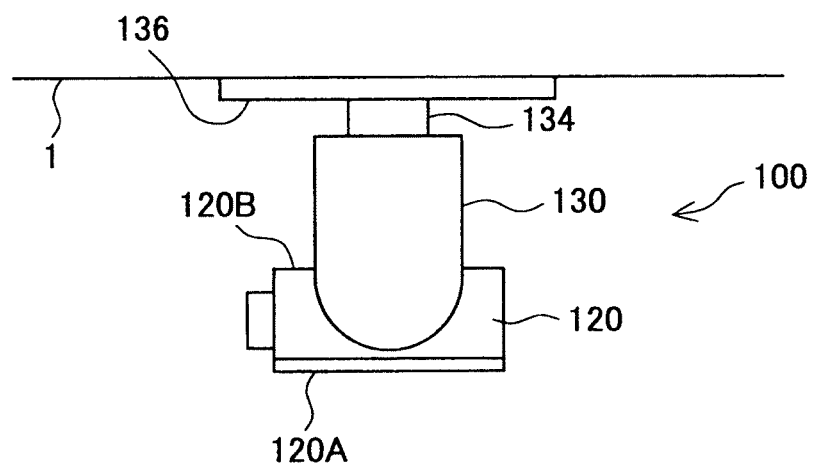
FIG. 6A is a side view showing the image capturing device 100 according to the embodiment.
Figure 6B:
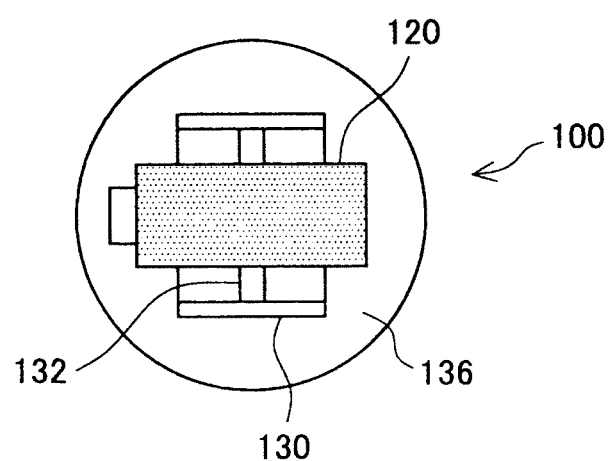
FIG. 6B is a bottom view showing the image capturing device 100 according to the embodiment.

The position of the main body 120 shown in FIGS. 4A and 4B is assumed to be "pan angle=0°". In FIG. 4A and FIG. 4B, the image capturing device 100 captures a right image in the figures. FIG. 5A and FIG. 5B show a state when the main body 120 rotate 90° around the shaft direction of the rotation shaft member 134 from the state of FIG. 4A and FIG. 4B and the position of the main body 120 becomes "pan angle=90°". Further, FIG. 6A and FIG. 6B show a state when the main body 120 rotate 180° around the shaft direction of the rotation shaft member 134 from the state of FIG. 4A and FIG. 4B and the position of the main body 120 becomes "pan angle=180°". In FIG. 6A and FIG. 6B, the image capturing device 100 captures a left image in the figures.

In this way, the image capturing device 100 can capture an image in the direction opposite to the image capturing direction of "pan angle=0°" only by the pan operation.

Next, the tilt operation of the image capturing device 100 will be described.

Figure 7A:
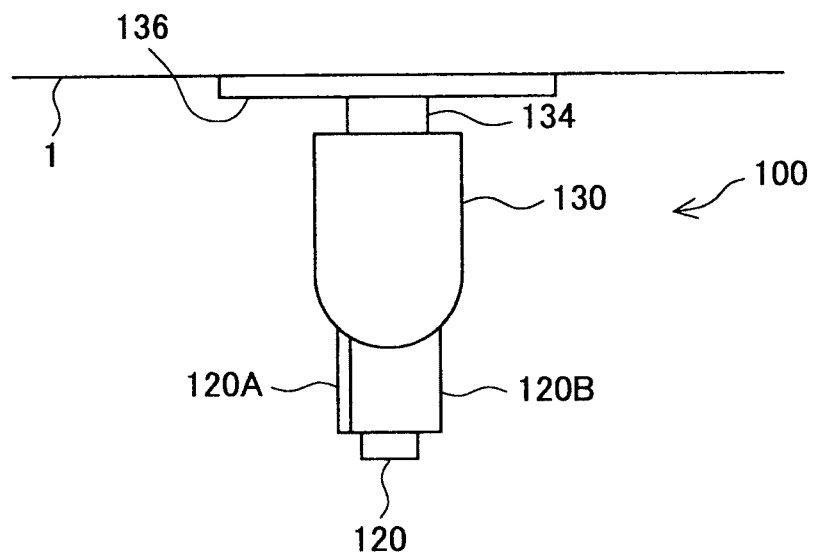
FIG. 7A is a side view showing the image capturing device 100 according to the embodiment.
Figure 7B:
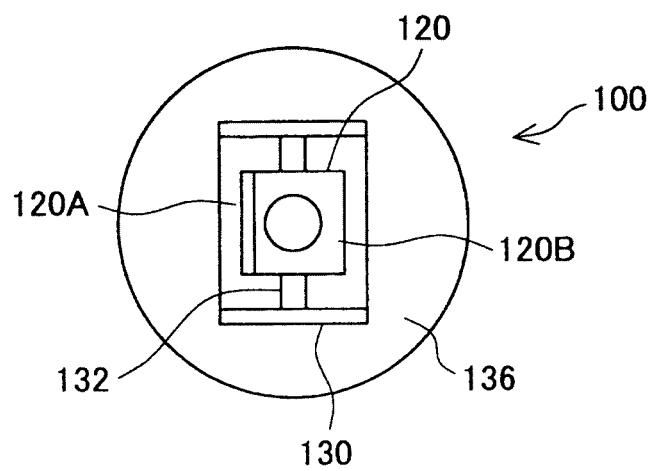
FIG. 7B is a bottom view showing the image capturing device 100 according to the embodiment.
Figure 8A:
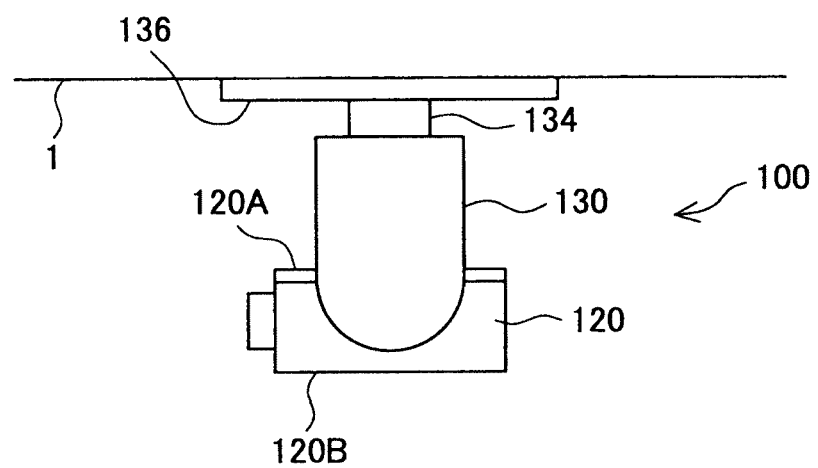
FIG. 8A is a side view showing the image capturing device 100 according to the embodiment.
Figure 8B:
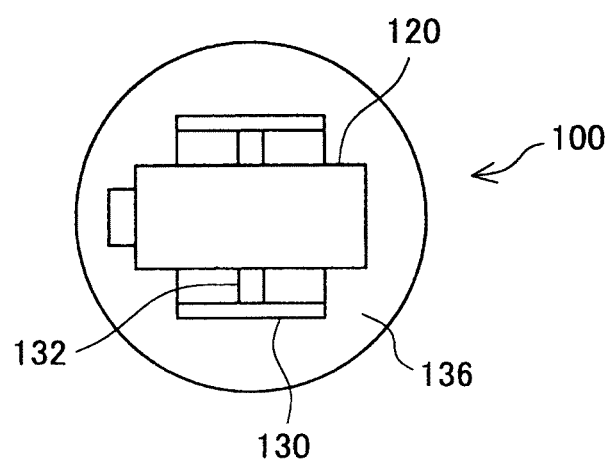
FIG. 8B is a bottom view showing the image capturing device 100 according to the embodiment.

The position of the main body 120 shown in FIGS. 4A and 4B is assumed to be "pan angle=0° and tilt angle=0°". In FIG. 4A and FIG. 4B, the image capturing device 100 captures a right image in the figures. FIG. 7A and FIG. 7B show a state when the main body 120 rotate 90° around the shaft direction of the rotation shaft member 132 from the state of FIG. 4A and FIG. 4B and the position of the main body 120 becomes "tilt angle=−90°". Further, FIG. 8A and FIG. 8B show a state when the main body 120 rotates 180° around the shaft direction of the rotation shaft member 132 from the state of FIG. 4A and FIG. 4B and the position of the main body 120 becomes "tilt angle=−180°".

In this way, the image capturing device 100 can capture an image in the direction opposite to the image capturing direction of "pan angle=0° and tilt angle=0°" only by the tilt operation.

Based on the above operations, to capture an image in the direction opposite to the image capturing direction of "pan angle=0° and tilt angle=0°", there are two methods, one method is that the main body 120 is moved only by the pan operation, and the other method is that the main body 120 is moved only by the tilt operation. Regarding the orientation of the main body 120 obtained as results of the two operations, although the image capturing directions are the same, the up-down directions of the main body 120 are opposite to each other as shown in FIGS. 6 and 8. Specifically, at the position shown in FIG. 4, a first surface 120A of the main body 120 is located at the lower side and a second surface 120B is located at the upper side. When the main body 120 moves to the position shown in FIG. 6 only by the pan operation, the first surface 120A is still located at the lower side and the second surface 120B is still located at the upper side. On the other hand, when the main body 120 moves to the position shown in FIG. 8 only by the tilt operation, the first surface 120A is located at the upper side and the second surface 120B is located at the lower side.

In the above cases, when the main body 120 moves only by the pan operation, it is not necessary to turn upside-down the output image captured by the image capturing device 100, and the image can be used without changing the up-down direction of the image. On the other hand, when the main body 120 moves only by the tilt operation, it is necessary to perform image processing to turn upside-down the output image captured by the image capturing device 100. By the above operation, the up-down direction of the subject can be matched to the up-down direction of the image.

As described above, although there are two moving methods for capturing an image in the direction opposite to the image capturing direction of "pan angle=0° and tilt angle=0°", the two moving methods are not the same from the viewpoints of the mechanism of the image capturing device 100 and the output image. When the main body 120 moves from a certain position to another position, in particular when the main body 120 moves more than the tilt angle of 90°, there are two moving methods in the same manner as described above. Then, the two moving methods are not the same from the viewpoints of the mechanism of the image capturing device 100 and the output image.

The fact that the two moving methods are not the same from the viewpoint of the mechanism of the image capturing device 100 further causes the following issue. Specifically, the rotation axis of the pan operation or the rotation axis of the tilt operation does not necessarily match the central axis of the main body of the image capturing device 100. Therefore, when there are the two moving methods of the main body 120, an image of the same subject may be differently captured depending on the moving method even if the image capturing direction is the same.

Figure 9A:
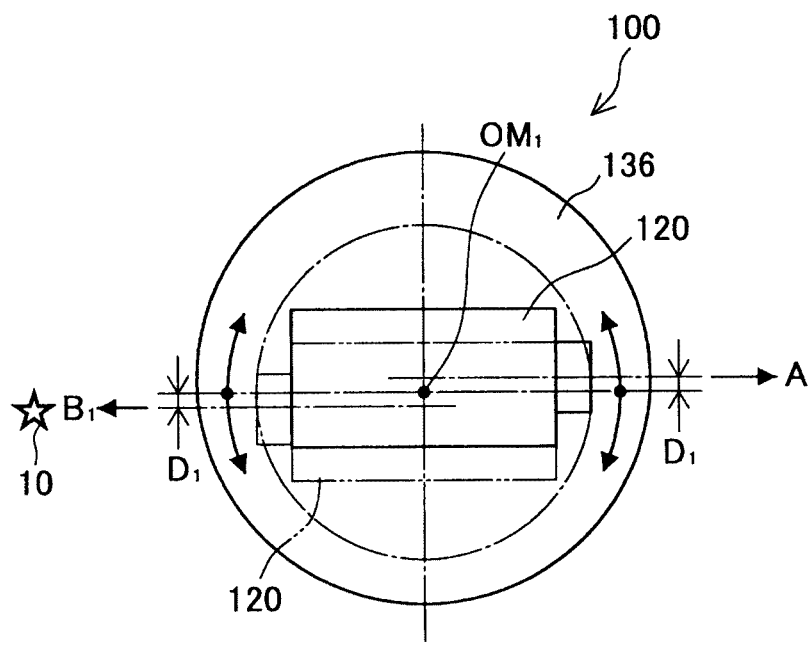
FIG. 9A is a bottom view schematically showing the image capturing device 100 according to the embodiment.
Figure 9B:
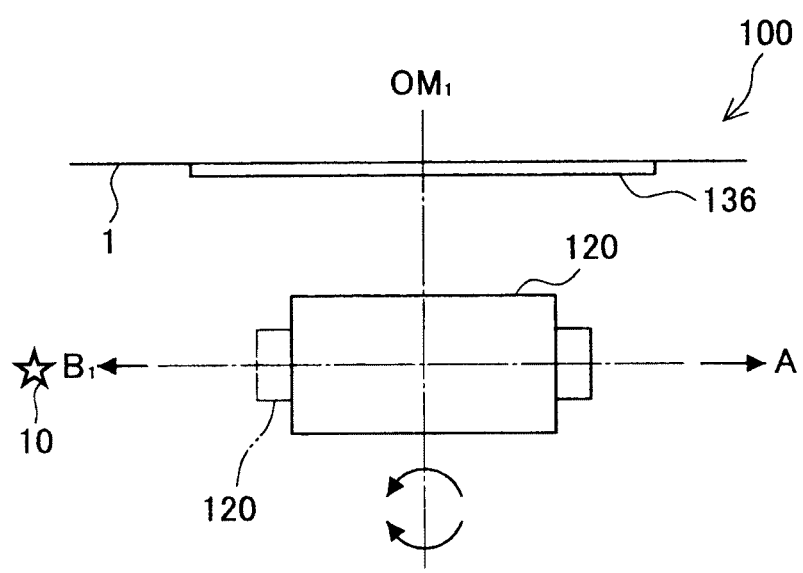
FIG. 9B is a side view schematically showing the image capturing device 100 according to the embodiment.
Figure 10A:
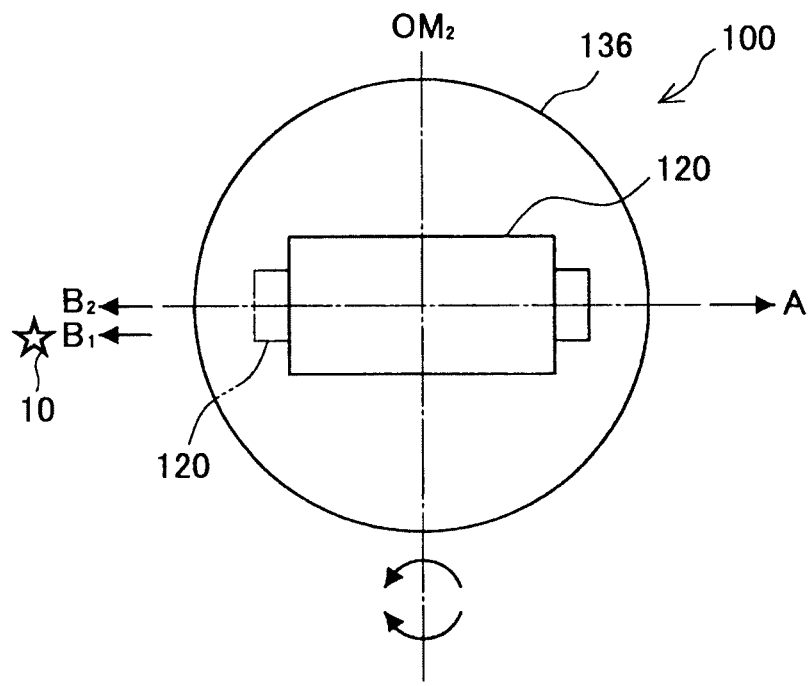
FIG. 10A is a bottom view schematically showing the image capturing device 100 according to the embodiment.
Figure 10B:
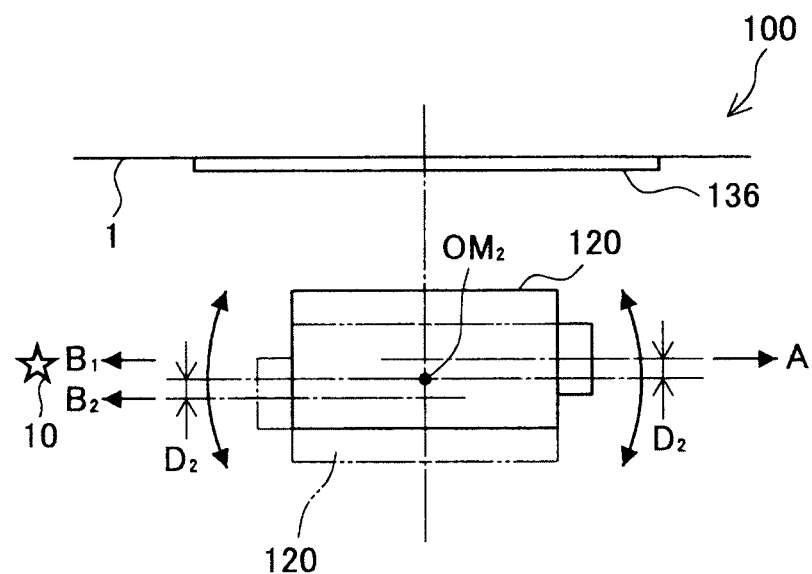
FIG. 10B is a side view schematically showing the image capturing device 100 according to the embodiment.
Figure 11A:
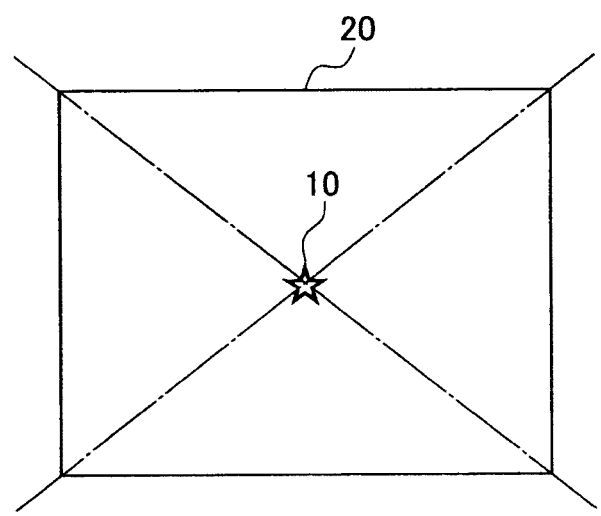
FIG. 11A is an explanatory diagram showing a screen 20 on which a subject image 10 captured by the image capturing device 100 is displayed.
Figure 11B:
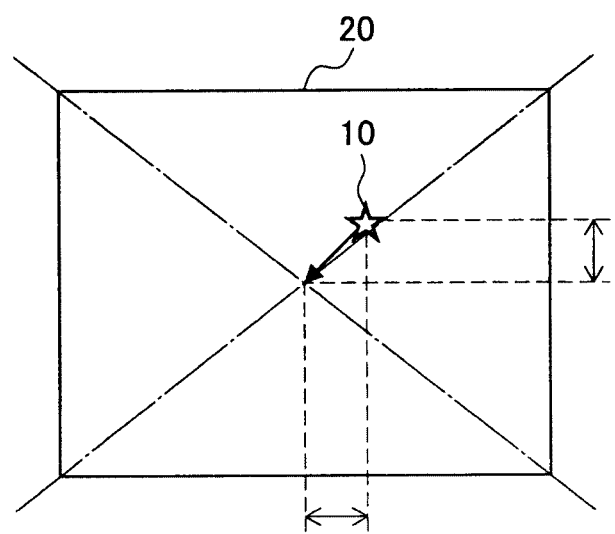
FIG. 11B is an explanatory diagram showing a screen 20 on which a subject image 10 captured by the image capturing device 100 is displayed.

FIGS. 9 and 10 are a bottom view (A) and a side view (B) schematically showing the image capturing device 100 according to this embodiment. FIG. 9 shows a case in which the image capturing device 100 performs the pan operation and FIG. 10 shows a case in which the image capturing device 100 performs the tilt operation. FIG. 11 is an explanatory diagram showing a screen 20 on which a subject image 10 captured by the image capturing device 100 is displayed. FIG. 11A is the screen 20 obtained as a result of the pan operation of FIG. 9, and FIG. 11B is the screen 20 obtained as a result of the tilt operation of FIG. 10.

When the main body 120 moves from an image capturing direction A to an image capturing direction $B_1$ by movement of a pan angle of 180°, as shown in FIG. 9, it is assumed that a rotation axis $OM_1$ of the pan operation is shifted from the central axis of the main body 120 of the image capturing device 100 by $D_1$ in the horizontal plane. At this time, as shown in FIG. 11A, the image of the subject 10 captured from the image capturing direction $B_1$ is located at the center of the screen 20. The coordinates representing the position of the main body 120 that faces the image capturing direction $B_1$ are assumed to be $(p_1, t_1)$.

On the other hand, as shown in FIG. 10, it is assumed that a rotation axis $OM_2$ of the tilt operation is shifted from the central axis of the main body 120 of the image capturing device 100 by $D_2$ in the vertical plane. At this time, even when the main body 120 tries to move from the image capturing direction A to the image capturing direction $B_1$ by movement of a tilt angle of 180°, the image capturing direction does not match the image capturing direction $B_1$ because the image capturing direction becomes $B_2$ by simply moving by the tilt angle of 180°. At this time, as shown in FIG. 11B, the image of the subject 10 captured from the image capturing direction $B_2$ is located at a position shifted from the center of the screen 20. The coordinates representing the position of the main body 120 that faces the image capturing direction $B_2$ are assumed to be $(p_2, t_2)$.

In summary, when the coordinates representing the position of the main body 120 before the rotation are $(p_0, t_0)$, the coordinates representing the position of the main body 120 after the rotation of the pan angle of 180° are $(p_1, t_1)$. The coordinates representing the position of the main body 120 after the rotation of the tilt angle of 180° are $(p_2, t_2)$. As a result, even if the position of the main body 120 is the same before the rotation, the positions after each rotation are shifted from each other depending on the moving method.

When the rotation axis of the pan operation or the rotation axis of the tilt operation matches the central axis of the main body of the image capturing device 100, even if there are two types of moving methods, the position of the main body 120 can be matched. As a result, the image of the subject can be captured in the same position. However, as described above, if there is misalignment between the rotation axis of the pan operation or the rotation axis of the tilt operation and the central axis of the main body of the image capturing device 100, the image of the subject is difficult to be captured in the same position.

<3. Coordinate System in the Image Capturing System>

Next, a coordinate system in the image capturing system according to this embodiment will be described.

To represent the image capturing direction of the image capturing device 100, a coordinate system (hereinafter referred to as "pan-tilt coordinate system") using the pan angle and the tilt angle of the main body 120 (the image capturing section 102) is used.

The image capturing device 100 according to this embodiment can rotate 360° in the pan operation and rotate from the horizontal direction (0°) to the opposite horizontal direction (180°) in the tilt operation. When the image capturing device 100 has such a mechanism, there are two positions at which the image capturing directions are the same although the absolute positions of the main body 120 are different from each other. Specifically, when representing the position of the main body 120 by the pan-tilt coordinate system based on the absolute position of the main body 120, both the main body 120 at a position of (pan angle, tilt angle)=(0°, 0°) and the main body 120 at a position of (pan angle, tilt angle)=(−180°, −180°) capture a subject in the same direction.

When there is no misalignment between the rotation axis of the pan operation or the rotation axis of the tilt operation and the central axis of the main body of the image capturing device 100, the positions of the subject image in the screen can be matched to each other. However, when there is misalignment between the rotation axis of the pan operation or the rotation axis of the tilt operation and the central axis of the main body of the image capturing device 100, misalignment occurs between the positions of the subject image.

By the way, the present inventors learned that the method for representing the image capturing direction of the image capturing device 100 in the pan-tilt coordinate system is roughly classified into two methods. Specifically, a first method is a method for representing the absolute position of the main body 120 in the pan-tilt coordinate system, and a second method is a method for representing the position of the subject image in the screen in the pan-tilt coordinate system.

In the past, the method for representing the image capturing direction of the image capturing device 100 by coordinates was not classified into the two methods, and the two methods were treated as one method. Thus, in this embodiment, two types of pan-tilt coordinate systems are prepared, and either one can be selected in accordance with usage.

Figure 12A:
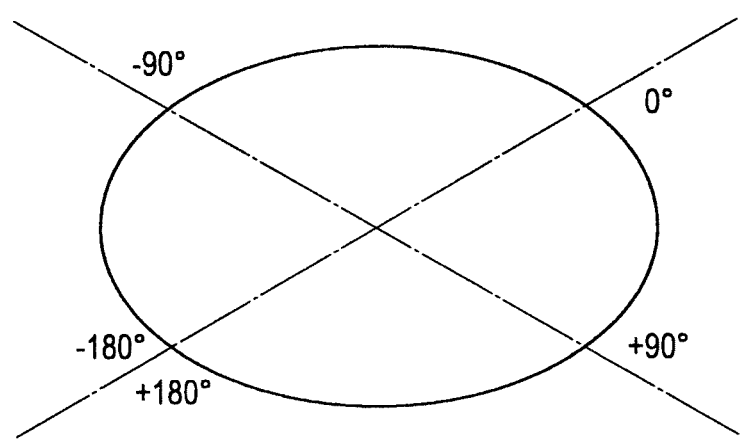
FIG. 12A is an explanatory diagram showing a first coordinate system used in the image capturing system according to the embodiment.
Figure 12B:
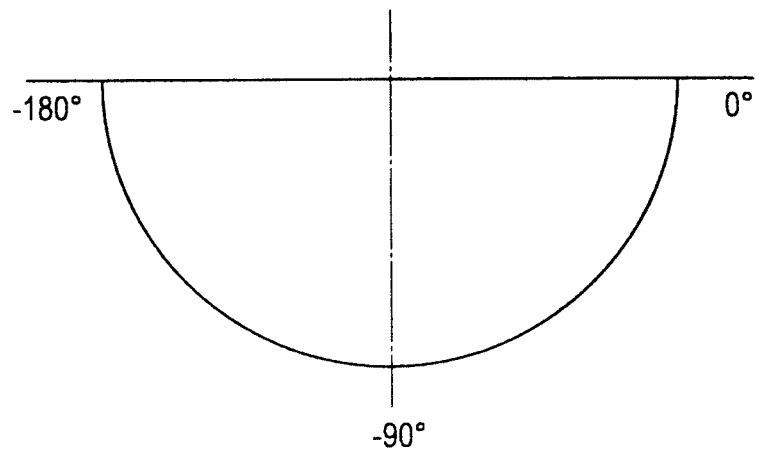
FIG. 12B is an explanatory diagram showing a first coordinate system used in 20 the image capturing system according to the embodiment.
Figure 13A:
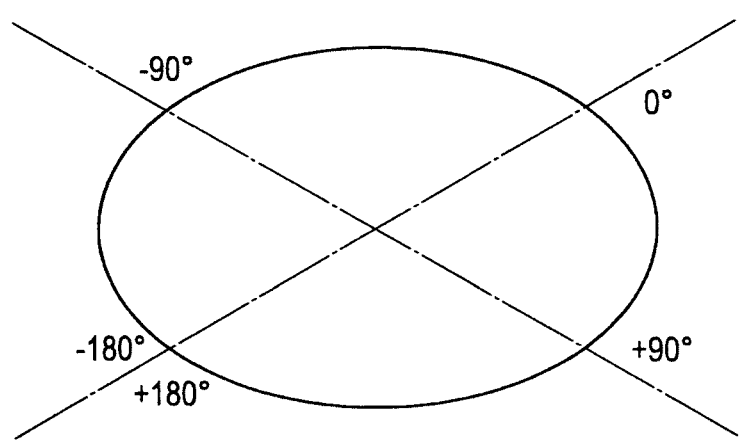
FIG. 13A is an explanatory diagram showing a second coordinate system used in the image capturing system according to the embodiment.
Figure 13B:
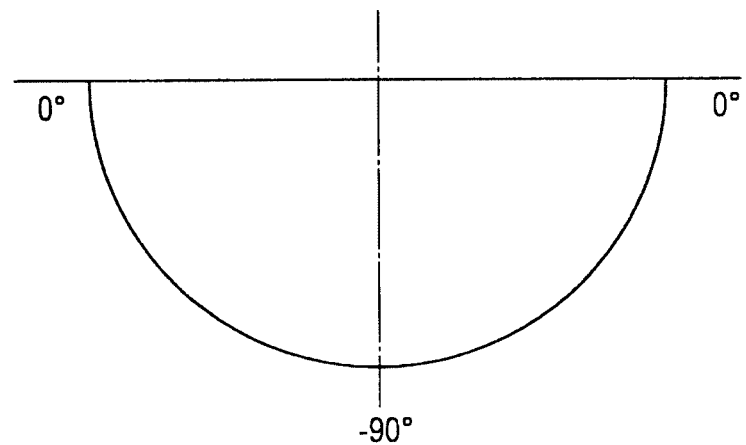
FIG. 13B is an explanatory diagram showing a second coordinate system used in the image capturing system according to the embodiment.

A first coordinate system is a coordinate system for representing the absolute position of the main body 120 of the image capturing device 100 in the pan direction and the tilt direction. FIG. 12 is an explanatory diagram showing the first coordinate system used in the image capturing system according to this embodiment. FIG. 12A is coordinate axes in the pan direction and FIG. 12B is coordinate axes in the tilt direction. A second coordinate system is a coordinate system for representing the position of the subject image captured by the image capturing device 100 in the screen. FIG. 13 is an explanatory diagram showing the second coordinate system used in the image capturing system according to this embodiment. FIG. 13A is coordinate axes in the pan direction and FIG. 13B is coordinate axes in the tilt direction.

In the coordinate axes in the pan direction in the first coordinate system, as shown in FIG. 12A, one direction is set as 0°, 0° to +180° are set in clockwise direction, and 0° to −180° are set in counterclockwise direction. In the coordinate axes in the tilt direction in the first coordinate system, one direction (horizontal direction) is set as 0°, the direction perpendicular to the one direction is set as −90°, and 0° to −180° are set.

The first coordinate system is a coordinate system capable of identifying the position of the main body 120 by unique coordinates. The first coordinate system is used to control a motor (driving section 104) for driving the main body 120 of the image capturing device 100 and move the main body 120 by specifying an absolute position (for example, a preset position).

Since the absolute position of the main body 120 can be specified by unique coordinates, there is an advantage when misalignment occurs between the rotation axis of the pan operation or the rotation axis of the tilt operation and the central axis of the main body of the image capturing device 100. For example, in the cases shown by using FIGS. 9 and 10, it is possible to distinguish a case in which the main body moves from (pan angle, tilt angle)=(0°, 0°) to (180°, 0°) (FIG. 9) and a case in which the main body moves from (pan angle, tilt angle)=(0°, 0°) to (0°, −180°) (FIG. 10). Although not shown in the figures, an image in the same image capturing direction can be captured both at (pan angle, tilt angle)=(0°, 0°) and (−180°, −180°). However, the up-down directions of the main body 120 are different. It is possible to distinguish them by using the first coordinate system.

Based on this, the first coordinate system can be said to be a coordinate system having high position reproducibility.

On the other hand, in the coordinate axes in the pan direction in the second coordinate system, as shown in FIG. 13A, one direction is set as 0°, 0° to +180° are set in clockwise direction, and 0° to −180° are set in counterclockwise direction. In the coordinate axes in the tilt direction in the second coordinate system, a first direction (horizontal direction) is set as 0°, and from the first direction to the direction perpendicular to the first direction is set as 0° to −90°. Further, the direction (horizontal direction, second direction) 180° from the first direction (horizontal direction) is also set as 0°, and from the second direction to the direction perpendicular to the second direction is set as 0° to −90°.

Since the second coordinate system represents the coordinate axes in the tilt direction only in a range from 0° to −90°, there is an advantage when representing the position of the subject image in the screen. In other words, when the first coordinate system is used, there are two different coordinate values to represent the position of the subject image, so that there is an issue that the coordinate system becomes complex when using the pan-tilt coordinate system on an application. For example, in processing using the pan-tilt coordinate system, it is necessary to set necessary information to the two coordinate values respectively, or cause the processing to recognize the two coordinate values as if the two coordinate values were the same. Here, the processing using the pan-tilt coordinate system is processing such as, for example, privacy masking, area titling, or area zoom, and the second coordinate system is suitable to perform these processing.

The privacy masking is processing for masking a part of an area in the screen so that the subject image is difficult to identify. The area titling is processing for, for example, superimposing a name of the subject image on the subject image and displaying the name and the subject image on the screen. The area zoom is processing for detecting a specific subject image and zooming the subject image. To these processing, the second coordinate system, which can simplify calculations in the processing, may be applied.

Further, when using the second coordinate system, if the directions of two 0° in the coordinate axes in the tilt direction are adjusted in the pan direction and the tilt direction, it is possible to specify a correct position when capturing a subject image by specifying a specific position (a preset position). Specifically, when there is misalignment between the subject images on the screen at (pan angle, tilt angle)=(0°, 0°) and (−180°, −180°) in the first coordinate system, the position of the main body 120 at which the subject images match each other is detected. At this time, if the subject images at (0°, 0°) and (−179°, −178°) match each other, the (−179°, −178°) is set to (−180°, 0°) or (+180 °, 0°) in the second coordinate system, and stored. In this way, in the second coordinate system, it is possible to specify a correct position when capturing a subject image by specifying a specific position.

The second coordinate system has an advantage when representing the position of the subject image in the screen. Further, a user can operate the image capturing device 100 in the same way as operating an image capturing device having a mechanism that does not rotate from the horizontal direction (0°) to the opposite horizontal direction (180°) in the tilt operation but can rotate only to the perpendicular direction (90°).

Next, a method for calculating coordinates in the second coordinate system based on the absolute position of the main body 120 of the image capturing device 100 will be described.

When the tilt angle exceeds −90° at an absolute position of the main body 120, the tilt angle is converted to match the second coordinate system. For example, the conversion can be realized by the program as described below.

```
          when
   pan = −180° to +180°
     tilt = −180° to 0°
       if(tilt≤−90°(b)){
         tilt = −90°+(−90°(a)−tilt);
           if(pan<0°){
```

```
            pan = pan+180°⁽ᵃ⁾;
        }else{
            pan = pan-180°⁽ᵃ⁾;
    }
}
```

Figure 15:
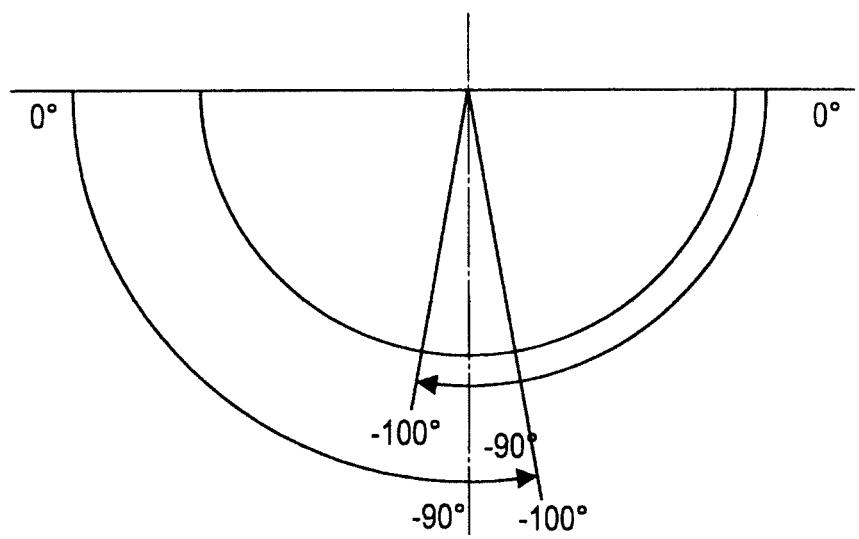
FIG. 15 is an explanatory diagram showing a modified example of a coordinate system used in the image capturing system according to the embodiment.

Here, as described above, to adjust the coordinate axes so that the correct position of the subject image can be specified in the second coordinate system, the angle indicated by the superscript (a) is adjusted. When the angle indicated by the superscript (b) is 100°, as shown in FIG. 15, in the coordinate axes in the tilt direction in the second coordinate system, a first direction (horizontal direction) is set to 0°, and 0° to −100° are set from the first direction. Further, the direction 180° from the first direction (horizontal direction) is also set to 0° (horizontal direction, second direction), and 0° to −100° can be set from the second direction. FIG. 15 is an explanatory diagram showing a modified example of the coordinate system used in the image capturing system according to this embodiment.

As described in the above, a coordinate system is selected in accordance with various processing of the image capturing device 100, and the coordinate position of the main body 120 (image capturing section 102) of the image capturing device 100 is calculated under the selected coordinate system. Based on this, it is possible to appropriately identify the position of the image capturing section 102 and appropriately identify the position of the subject image in the screen when the image capturing device 100 includes a mechanism that can rotate 360° in the pan operation and rotate from the horizontal direction (0°) to the opposite horizontal direction (180°) in the tilt operation.

Although, a preferred embodiment of the present invention has been described in detail with reference to the appended drawings, the present invention is not limited to such embodiment. It should be understood by those skilled in the art that various modifications, combinations, sub-combinations and alterations may occur depending on design requirements and other factors insofar as they are within the scope of the appended claims or the equivalents thereof.

Figure 14A:
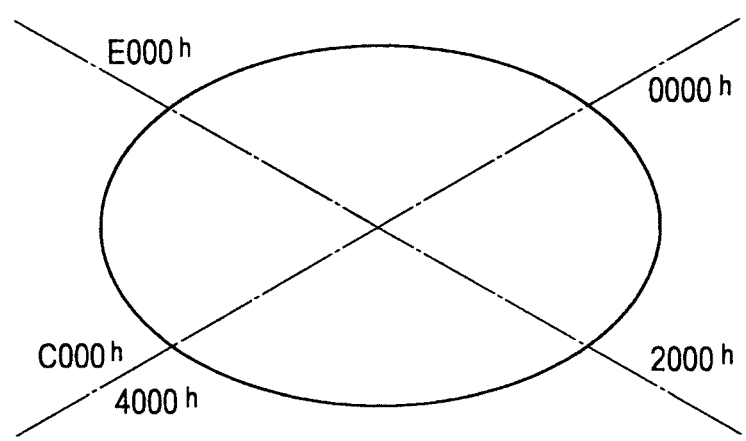
FIG. 14A is an explanatory diagram showing a modified example of a coordinate system used in the image capturing system according to the embodiment.
Figure 14B:
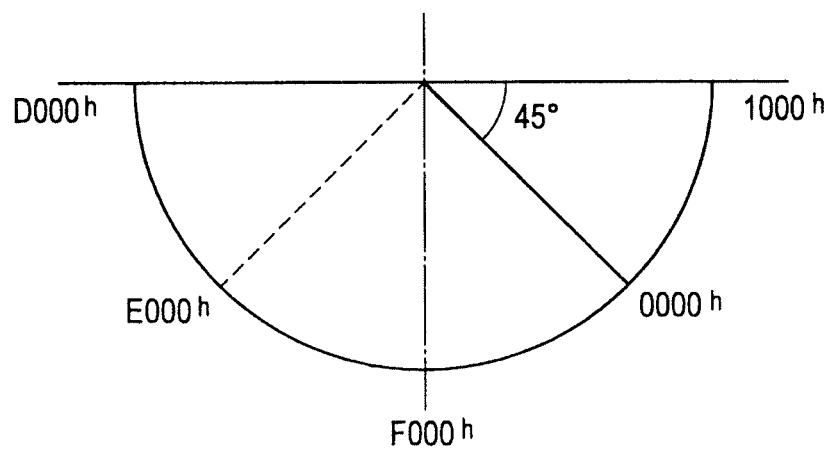
FIG. 14B is an explanatory diagram showing a modified example of a coordinate system used in the image capturing system according to the embodiment.

Although, in the embodiment described above, the degree (°) is used as a unit of angle, the present invention is not limited to such embodiment. For example, as shown in FIG. 14, the angle may be represented by a hexadecimal number. Further, although, in the embodiment described above, the horizontal direction in the coordinate axes in the tilt direction is set to 0 (°), the present invention is not limited to such embodiment. As shown in FIG. 14B, the direction −45° from the horizontal direction may be set as a reference direction (0). FIG. 14 is an explanatory diagram showing a modified example of the coordinate system used in the image capturing system according to this embodiment.

Although, a case in which the image capturing device 100 is mounted on a ceiling is described, the present invention is not limited to such embodiment. For example, the present invention can be applied to a case in which the tilt operation is performed while the bottom of the image capturing device is fixed.

The present application contains subject matter related to that disclosed in Japanese Priority Patent Application JP 2009-213378 filed in the Japan Patent Office on Sep. 15, 2009, the entire content of which is hereby incorporated by reference.

What is claimed is:

1. An image capturing system comprising:
    a position detection section for receiving light from a subject and detecting a position of an image capturing section capable of performing a pan operation and a tilt operation in a pan direction and a tilt direction;
    a coordinate system determination section for determining only one of a plurality of coordinate systems to use among at least a first coordinate system representing an absolute position of the image capturing section in the pan direction and the tilt direction and a second coordinate system representing a position of a subject image of the subject captured by the image capturing section in a screen; and
    a coordinate calculator for calculating coordinates representing the position of the image capturing section in the first coordinate system based on the detected position of the image capturing section when using the first coordinate system, and calculating coordinates representing the position of the subject image in the second coordinate system based on the detected position of the image capturing section when using the second coordinate system,
    wherein a first direction of coordinate axes in the tilt direction in the second coordinate system is set as 0°, the first direction to a direction perpendicular to the first direction are set as 0° to −90°, a second direction 180° from the first direction is also set as 0°, and the second direction to a direction perpendicular to the second direction are set as 0° to −90°, and
    when a misalignment of the image capturing section is detected in the image capturing section in the first coordinate system, at least one of the first direction and the second direction of coordinate axes in the second coordinate system is reset to compensate for the misalignment.

2. The image capturing system according to claim 1, wherein the first coordinate system is a coordinate system specifying the position of the image capturing section by unique coordinates, and used when controlling a driving section that drives the image capturing section or moving the image capturing section by specifying an absolute position, and
    the second coordinate system is used for privacy masking processing for masking a part of an area in the screen so that the subject image is difficult to identify, area titling processing for superimposing a name of the subject image on the subject image and displaying the name and the subject image on the screen, or area zoom processing for detecting the specific subject image and zooming the subject image.

3. The image capturing system according to claim 1, wherein a third direction of coordinate axes in the pan direction in the first coordinate system is set as 0°, 0° to +180° are set in clockwise direction, and 0° to −180° are set in counterclockwise direction.

4. The image capturing system according to claim 1, wherein a fourth direction of coordinate axes in the tilt direction in the first coordinate system is set as 0°, a direction perpendicular to the fourth direction is set as −90°, and 0° to −180° are set from the fourth direction.

5. The image capturing system according to claim 1, wherein a fifth direction of coordinate axes in the pan direction in the second coordinate system is set as 0°, 0° to +180° are set in clockwise direction, and 0° to −180° are set in counterclockwise direction.

6. An image capturing device comprising:

a position detection section for receiving light from a subject and detecting a position of an image capturing section capable of performing a pan operation and a tilt operation in a pan direction and a tilt direction; and a position transmission section for transmitting the detected position to a remote control device including a coordinate system determination section for determining only one of a plurality of coordinate systems to use among at least a first coordinate system representing an absolute position of the image capturing section in the pan direction and the tilt direction and a second coordinate system representing a position of a subject image of the subject captured by the image capturing section in a screen and a coordinate calculator for calculating coordinates representing the position of the image capturing section in the first coordinate system based on the detected position of the image capturing section when using the first coordinate system, and calculating coordinates representing the position of the subject image in the second coordinate system based on the detected position of the image capturing section when using the second coordinate system, wherein a first direction of coordinate axes in the tilt direction in the second coordinate system is set as 0°, the first direction to a direction perpendicular to the first direction are set as 0° to −90°, a second direction 180° from the first direction is also set as 0°, and the second direction to a direction perpendicular to the second direction are set as 0° to −90°, and when a misalignment of the image capturing section is detected in the image capturing section in the first coordinate system, at least one of the first direction and the second direction of coordinate axes in the second coordinate system is reset to compensate for the misalignment.

7. An information processing device comprising:

a position receiving section for receiving a detected position from an image capturing device including a position detection section for receiving light from a subject and detecting a position of an image capturing section capable of performing a pan operation and a tilt operation in a pan direction and a tilt direction;

a coordinate system determination section for determining only one of a plurality of coordinate systems to use among at least a first coordinate system representing an absolute position of the image capturing section in the pan direction and the tilt direction and a second coordinate system representing a position of a subject image of the subject captured by the image capturing section in a screen; and a coordinate calculator for calculating coordinates representing the position of the image capturing section in the first coordinate system based on the detected position of the image capturing section when using the first coordinate system, and calculating coordinates representing the position of the subject image in the second coordinate system based on the detected position of the image capturing section when using the second coordinate system, wherein a first direction of coordinate axes in the tilt direction in the second coordinate system is set as 0°, the first direction to a direction perpendicular to the first direction are set as 0° to −90°, a second direction 180° from the first direction is also set as 0°, and the second direction to a direction perpendicular to the second direction are set as 0° to −90°, and when a misalignment of the image capturing section is detected in the image capturing section in the first coordinate system, at least one of the first direction and the second direction of coordinate axes in the second coordinate system is reset to compensate for the misalignment.

8. An image capturing method comprising the steps of:

receiving light from a subject and detecting a position of an image capturing section capable of performing a pan operation and a tilt operation in a pan direction and a tilt direction;

determining only one of a plurality of coordinate systems to use among at least a first coordinate system representing an absolute position of the image capturing section in the pan direction and the tilt direction and a second coordinate system representing a position of a subject image of the subject captured by the image capturing section in a screen; and calculating coordinates representing the position of the image capturing section in the first coordinate system based on the detected position of the image capturing section when using the first coordinate system, and calculating coordinates representing the position of the subject image in the second coordinate system based on the detected position of the image capturing section when using the second coordinate system, wherein a first direction of coordinate axes in the tilt direction in the second coordinate system is set as 0°, the first direction to a direction perpendicular to the first direction are set as 0° to −90°, a second direction 180° from the first direction is also set as 0°, and the second direction to a direction perpendicular to the second direction are set as 0° to −90°, and when a misalignment of the image capturing section is detected in the image capturing section in the first coordinate system, at least one of the first direction and the second direction of coordinate axes in the second coordinate system is reset to compensate for the misalignment.

* * * * *